(12) United States Patent
Travison, Jr. et al.

(10) Patent No.: US 10,334,079 B2
(45) Date of Patent: Jun. 25, 2019

(54) ORCHESTRATING OPERATIONS AT APPLICATIONS

(71) Applicant: Microsoft Technology Licensing, LLC, Redmond, WA (US)

(72) Inventors: Daniel T. Travison, Jr., Carnation, WA (US); Yuan Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/193,113

(22) Filed: Jun. 27, 2016

(65) Prior Publication Data
US 2017/0373958 A1 Dec. 28, 2017

(51) Int. Cl.
*H04L 12/24* (2006.01)
*H04L 29/06* (2006.01)
*H04L 29/08* (2006.01)

(52) U.S. Cl.
CPC .......... *H04L 67/42* (2013.01); *H04L 41/5035* (2013.01); *H04L 67/10* (2013.01)

(58) Field of Classification Search
CPC ..................................................... H04L 43/08
See application file for complete search history.

(56) References Cited

U.S. PATENT DOCUMENTS

| 6,996,809 | B2 | 2/2006 | Muhlestein et al. |
| 7,313,613 | B1 | 12/2007 | Brooking et al. |
| 7,526,685 | B2 | 4/2009 | Noy et al. |
| 7,634,519 | B2 | 12/2009 | Creamer et al. |
| 7,634,682 | B2 | 12/2009 | Black et al. |
| 8,266,239 | B2 | 9/2012 | Wookey et al. |
| 8,601,155 | B2 | 12/2013 | Toombs et al. |
| 2004/0143659 | A1 | 7/2004 | Milliken et al. |

(Continued)

FOREIGN PATENT DOCUMENTS

WO 2015200508 A1 12/2015

OTHER PUBLICATIONS

"Instrumentation and Telemetry Guidance", Published on: Mar. 6, 2014 Available at: https://msdn.microsoft.com/en-us/library/dn589775.aspx.

(Continued)

*Primary Examiner* — Vivek Srivastava
*Assistant Examiner* — Nicholas P Celani
(74) *Attorney, Agent, or Firm* — Ray Quinney & Nebeker, P.C.; Thomas M. Hardman; Stephen A. Wight (57) ABSTRACT

Aspects extend to methods, systems, and computer program products for orchestrating operations at applications. Aspects of the invention use a side channel (instrumentation messages generated by a service) as a mechanism to discover when a service has completed an activity. Use of a side channel, allows a (e.g., client) application to create behaviors similar to service side interfaces and/or protocols without modifying a service. Accordingly, functionality can be added incrementally, safely, and cheaply without having to revise an underlying implementation. In one aspect, an instrumentation collector and publisher (ICP) facilitates the synchronization between services and an application. ICP is a scalable infrastructure that provides applications a way to interact with servers through instrumentation.

19 Claims, 5 Drawing Sheets

(56) References Cited

U.S. PATENT DOCUMENTS

| | | | |
|---|---|---|---|
| 2006/0168011 A1* | 7/2006 | Lamport | G06F 11/1494 709/206 |
| 2006/0190218 A1 | 8/2006 | Agrawal et al. | |
| 2008/0127299 A1* | 5/2008 | Carter | G06F 21/64 726/1 |
| 2010/0223499 A1* | 9/2010 | Panigrahy | G06F 11/0709 714/19 |
| 2011/0283263 A1 | 11/2011 | Gagliardi et al. | |
| 2012/0102168 A1* | 4/2012 | Mercuri | G06F 9/542 709/223 |
| 2015/0378756 A1 | 12/2015 | Lensmar et al. | |

OTHER PUBLICATIONS

"Application Insights for Azure Cloud Services", Published on: Apr. 6, 2016 Available at: https://azure.microsoft.com/en-us/documentation/articles/app-insights-cloudservices/.

\* cited by examiner

ORCHESTRATING OPERATIONS AT APPLICATIONS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In some environments, a client application performs a task that relies on functionality at a number of different services. The client application can call each different service to perform one or more actions related to the task. Further, some parts of a task can depend on the completion of actions associated with other parts of the task. However, the services may lack interfaces and/or protocols for reporting when actions complete. Thus, the client application has no way to know when actions performed at any of the services have actually completed.

Lack of knowledge with respect to when service actions complete can prevent the client application from reliably moving forward with the further actions for the task. It may be that the client application is prevented from moving forward at all. Alternately, the client application may assume or infer when service actions have completed and move forward based on the assumption or inference. When an assumption or inference is incorrect, dependent actions may function improperly or not all when other actions, from which they depend, have not actually completed.

When actions for a task function improperly or do not occur, performance of the task and possible also a user experience is degraded. For example, a user may not receive an accurate status report about the task or more complex orchestration between a number services used for the task may fail.

BRIEF SUMMARY

Examples extend to methods, systems, and computer program products for orchestrating operations at client applications. An application orchestrates a sequence of operations, including operations performed at external services. Some operations in the sequence of operations depend on completion of other operations in the sequence of operations.

An application requests creation of a subscription to collect runtime instrumentation output by the plurality of services. The application initiates performance of an operation included in the sequence of operations. The operation triggers performance of a plurality of service operations, including one or more service operations at each of the plurality of services. Performance of a next operation in the sequence of operations is dependent on state changes at the plurality of services.

An instrumentation manager receives the request from the application. The instrumentation manager creates a subscription to collect the runtime instrumentation output by the plurality of services. The instrumentation manager then collects runtime instrumentation for the subscription from instrumentation storage. The runtime instrumentation having been output by the plurality of services during performance of the plurality of service operations trigged by the operation. The runtime instrumentation indicates a state change for each of the plurality of services.

The instrumentation manager sends a stream of runtime instrumentation responsive to the subscription to the application. The stream of runtime instrumentation indicates the state change for each of the plurality of services. The application receives the stream of runtime instrumentation. The application initiates performance of the next operation based at least on the state change for each of the plurality of services being in the stream of runtime instrumentation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, and computer program products for orchestrating operations at client applications. An application orchestrates a sequence of operations, including operations performed at external services. Some operations in the sequence of operations depend on completion of other operations in the sequence of operations.

An application requests creation of a subscription to collect runtime instrumentation output by the plurality of services. The application initiates performance of an operation included in the sequence of operations. The operation triggers performance of a plurality of service operations, including one or more service operations at each of the plurality of services. Performance of a next operation in the sequence of operations is dependent on state changes at the plurality of services.

An instrumentation manager receives the request from the application. The instrumentation manager creates a subscription to collect the runtime instrumentation output by the plurality of services. The instrumentation manager then collects runtime instrumentation for the subscription from instrumentation storage. The runtime instrumentation having been output by the plurality of services during performance of the plurality of service operations trigged by the operation. The runtime instrumentation indicates a state change for each of the plurality of services.

The instrumentation manager sends a stream of runtime instrumentation responsive to the subscription to the application. The stream of runtime instrumentation indicates the state change for each of the plurality of services. The application receives the stream of runtime instrumentation. The application initiates performance of the next operation based at least on the state change for each of the plurality of services being in the stream of runtime instrumentation.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: subscription requests, subscriptions, state changes, instrumentation, normalized instrumentation, instrumentation streams, notifications, interfaces, and protocols.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, subscription requests, subscriptions, state changes, instrumentation, normalized instrumentation, instrumentation streams, notifications, interfaces, and protocols.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

Aspects of the invention use a side channel (instrumentation messages generated by a service) as a mechanism to discover when a service has completed an activity. Use of a side channel allows a client application to create behaviors similar to service side interfaces and/or protocols without modifying a service. Accordingly, functionality can be added incrementally, safely, and cheaply without having to revise an underlying implementation.

Use of a side channel also has advantages over polling and service modification techniques. Polling techniques are more successful if side-effects are both known in advance and visible to the client application. In the case of multiple machine workloads, side-effects are often not visible and/or are unpredictable. Additionally, polling inherently introduces overhead on the target system(s) since it requires querying various stores. Finally, polling models often suffer from scaling limitations.

Modifying a service assumes the source code for the service is available and the client application is authorized update the service. Additionally, the cost of changing and testing the service's implementation may be cost prohibitive. Finally, a code change to satisfy one application may not be useful to another; or even cause a breaking change.

In one aspect, an instrumentation collector and publisher (ICP) facilitates the synchronization between services and an application. ICP is a scalable infrastructure that provides other applications a way to interact with servers through instrumentation. Applications (e.g., client applications) subscribe to instrumentation of interest by invoking operations of ICP. ICP then calls instrumentation APIs to create a subscription in an instrumentation store.

When services perform operations, the services generate instrumentation (e.g., indicating state changes) that is stored in an instrumentation store. Any instrumentation stream that meets a subscribed condition is sent back to ICP. ICP decodes and normalizes these instrumentation streams and sends the normalized streams to a subscribing application. The application is then able to trigger subsequent operations knowing about the state changes from services, for example, that a service operation has completed, has an error, etc.

Figure 1:
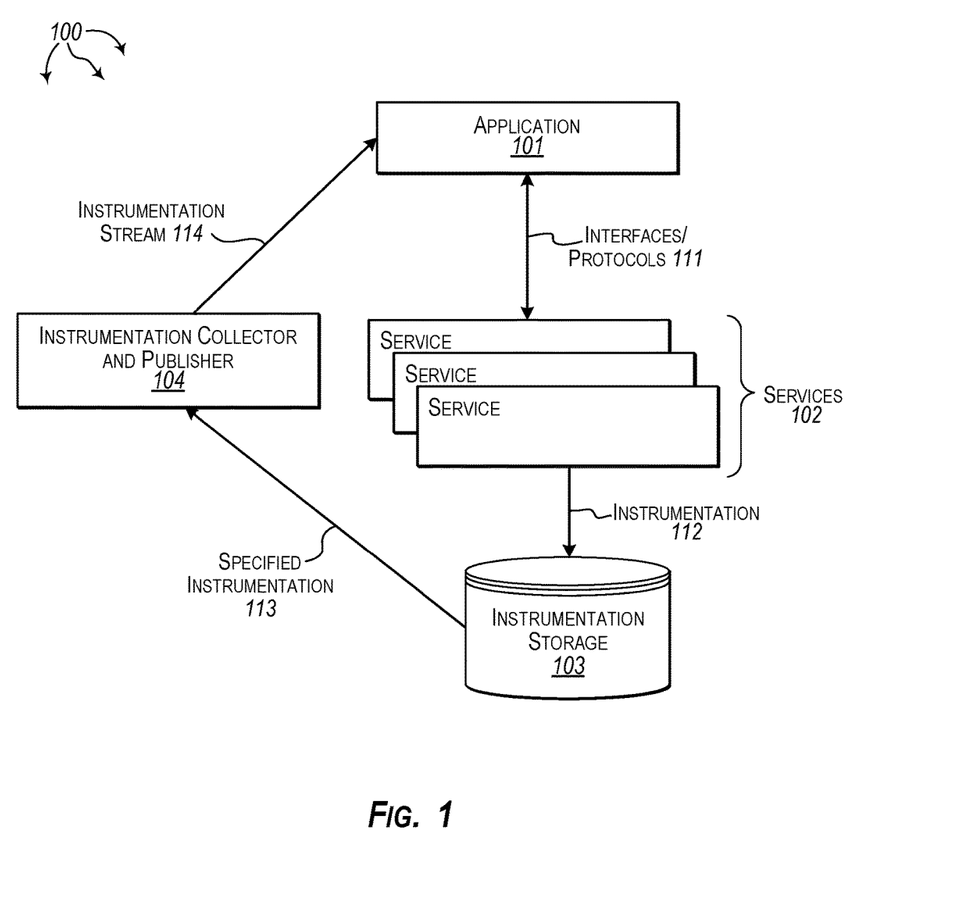
FIG. 1 illustrates an example computer architecture that facilitates orchestrating operations at an application.

FIG. 1 illustrates an example computer architecture 100 that facilitates orchestrating operations at applications. Referring to FIG. 1, computer architecture 100 includes application 101, services 102, instrumentation storage 103, and instrumentation collector and publisher (ICP) 104. Application 101, services 102, instrumentation storage 103, and ICP 104 can be connected to (or be part of) a network, such as, for example, a Local Area Network ("LAN"), a Wide Area Network ("WAN"), and even the Internet. Accordingly, application 101, services 102, instrumentation storage 103, and ICP 104 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

As depicted, application 101 and services 102 communicate using interfaces/protocols 111. Operations within application 101 can depend on the completion of other operations at services 102. However, interfaces/protocol 111 may not include a reliable mechanism to return state changes (e.g., a completion state, such as, success or failure, a ready state, a warning/error state, resource availability, etc.) from services 102 to application 101.

Application 101 can be a client application, a non-client application, or another service. Application 101 can extend the functionality of services 102 by listening to events and adding operations automatically.

Instrumentation 112 can be generated as services 102 perform service operations. Instrumentation 112 can be stored at instrumentation storage 103. Instrumentation 112 can include data indicating state changes for services 102 based on performed service operations. ICP 104 can collect specified instrumentation 113 from instrumentation storage 103. Specified instrumentation 113 can at least include the data indicating state changes for services 102 based on performed service operations. ICP 104 can stream instrumentation stream 114, including the data indicating state changes for services, to client application 104. Based on instrumentation stream 114, application 101 can determine the state of services and when dependent (e.g., client side) operations can be initiated.

Figure 2:
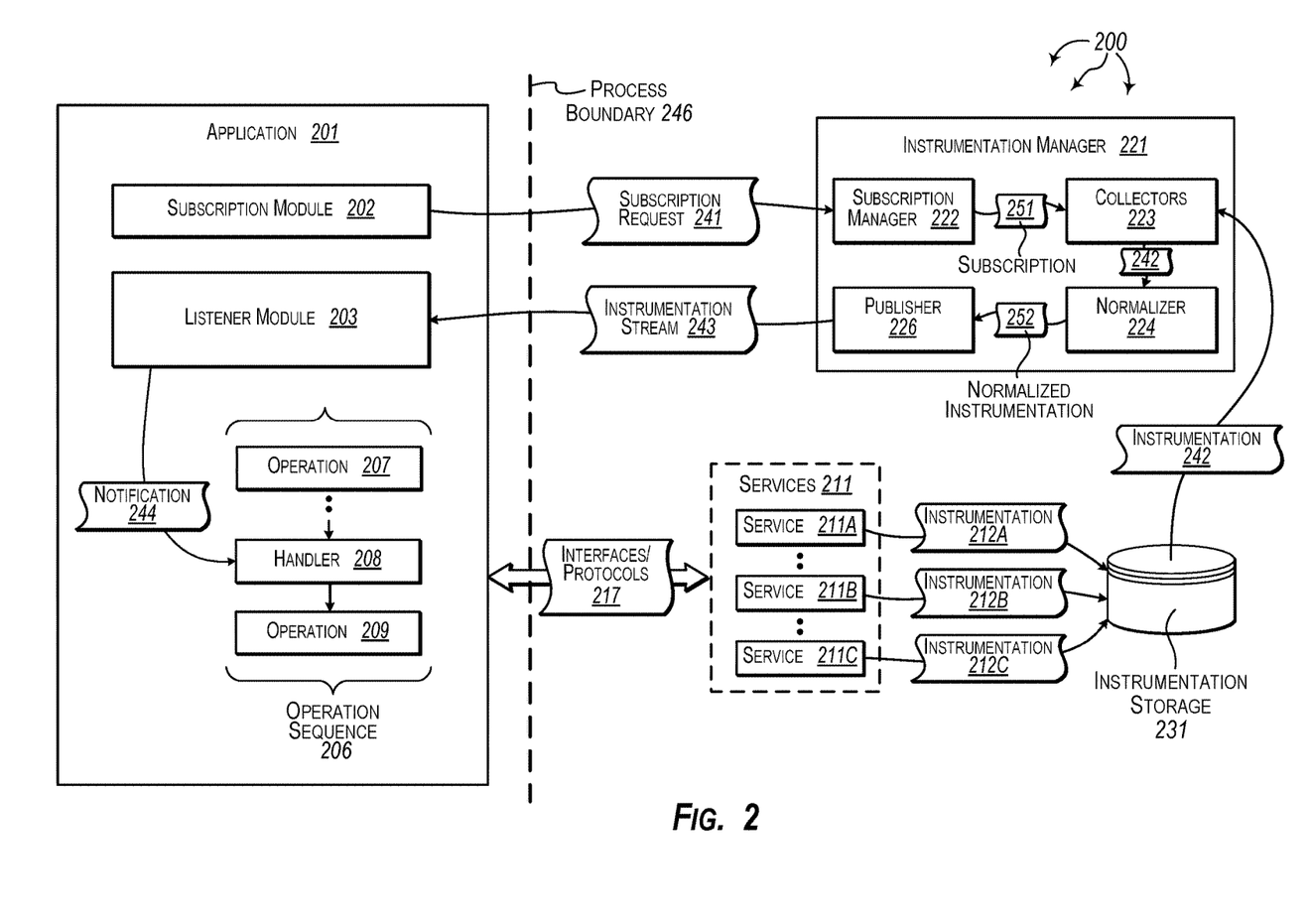
FIG. 2 illustrates an example computer architecture that facilitates orchestrating operations at an application.

FIG. 2 illustrates an example architecture 200 that facilitates orchestrating operations at applications. Referring to FIG. 2, computer architecture 200 includes application 201, services 211, instrumentation manager 221 (e.g., an ICP), and instrumentation storage 231. Application 201, services 211, instrumentation manager 221, and instrumentation storage 231 can be connected to (or be part of) a network, such as, for example, a Local Area Network ("LAN"), a Wide Area Network ("WAN"), and even the Internet. Accordingly, application 201, services 211, instrumentation manager 221, and instrumentation storage 231 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

As depicted, application 201 includes subscription module 202, listener module 203, and operation sequence 206. Application 201 can be a client application, a non-client application, or another service. Application 201 can extend the functionality of services 211 by listening to events and adding operations automatically.

Subscription module 202 is configured to request a subscription to collect instrumentation from services involved in an operation. Listener module 203 listens for instrumentation streams corresponding to requested subscriptions. When a (e.g., client) operation is dependent on one or more service operations, listener module 203 can interpret an instrumentation stream to determine when a state change for the one or more services is received. Listener module 203 can notify handlers in an operation sequence of a state change for a service A state change can include one or more of: a completion state, such as, for example, success or failure, a ready state, a warning/error state, a resource availability state, etc. In one aspect, orchestration may pause until one or more services or even an entire system has started. Orchestration may start up services to parallelize a request but may wait for a ready state to indicate that the services are ready. A warning/error state can alter the path of orchestration. For example, if a service exhibits an error state, another different service may be used to perform an operation or other operations can be performed. Orchestration may pause until sufficient resources (e.g., CPU, memory, storage, etc.) are available to perform the next operation. Resource availability events can be monitored. In some aspects, resource availability is monitored for virtualized environments, such as, Virtual Machines ("VMs") or emulated environments, such as, phone and embedded chip emulators.

Operations sequence 206 includes one or more (e.g., client) operations. Each operation can use various interfaces and/or protocols to trigger additional service operations at one or more services. Operations sequence 206 can also include one or more handlers. Handlers can receive a completion status from listener module 203. Based on a completion status, handlers can make decisions with respect to initiating operations that are dependent on completed service operations. In one aspect, operation sequence 206 includes a sequence of SQL operations.

In general, instrumentation manager 221 can include functionality similar to the functionality of ICP 104. Instrumentation manager 221 includes subscription manager 222, collectors 223, normalizer 224, and publisher 226. Subscription manager 222 can manage application subscriptions. Subscriptions can include filtering for instrumentation logged when a service state change occurs. For example, a subscription can include filtering for any error or warning events that are logged when a service operation fails. In this way, an operation can detect various different state changes when service operations are asynchronous and/or cross multiple process boundaries and/or cross multiple machine boundaries. For simpler Application Program Interface (API) calls, error filtering may not be needed since an API can return an error directly.

Collectors 223 provide an interface between instrumentation manager 221 and underlying instrumentation sources, such as, disk files, operating system events, application events, kernel events, etc. Instrumentation sources can come in many forms including but not limited to: logs, in-memory buffers, real-time interfaces, and remote protocols. A collector can provide an interface to a specific instrumentation source to provide a consistent interface to normalizer 224. Collectors 223 can include real-time operating system event tracing collectors, real-time event log collectors, and collectors for file-based event tracing and event logs.

Normalizer 224 converts various native instrumentation formats to a common format consumable by applications. Normalizer 224 can provide representations of named values, collections, and objects using a static schema capable of representing data from the various instrumentation sources (e.g., collectively represented as instrumentation storage 231).

A normalizer can normalize instrumentation (e.g., state changes) from multiple providers. The normalizer streams the instrumentation to the application in a form that is efficiently consumed by managed and unmanaged applications as well as many scripting languages. Clients of normalized instrumentation can be implemented in a variety of languages including: C++, C#, and PowerShell.

State changes can be normalized by reading and decoding the events on the source and creating corresponding full-fidelity objects. The normalization can occur behind the scenes and allows for consistent and predicable event data regardless of the data source. Normalization also facilities faster searching and fine-grained filtering, which further assists local and remote synchronization.

Publisher 226 routes collected instrumentation (e.g., state changes) to appropriate endpoints (e.g., client applications).

Services 211 includes services 211A, 211B, and 211C. Each of services 211A, 211B, and 211C can perform service operations triggered by an application operation being performed at application 201. As services 211 perform service operations, instrumentation can be stored at instrumentation storage 231. For example, instrumentation 212A, 212B, and 212C can be stored for services 211A, 211B, and 211C respectively. Instrumentation for each service can include data indicating state changes (e.g., completion status, ready state, warning/error state, resource availability states, etc.) resulting from service operations performed by the service.

As such, collectors 223 can collect the instrumentation and publisher 226 can stream the instrumentation to application 201. Application 201 can make decisions for performing dependent operations based on state changes in streamed instrumentation.

As depicted, application 201 and services 211 can communicate across process boundary 246 using interfaces/protocols 247. Thus, operations at application 201 can use interfaces/protocols 247 to trigger service operations at services 211. However, interfaces/protocols 247 may lack mechanisms to reliably indicate a state changes for triggered service operations back to application 201.

Figure 3:
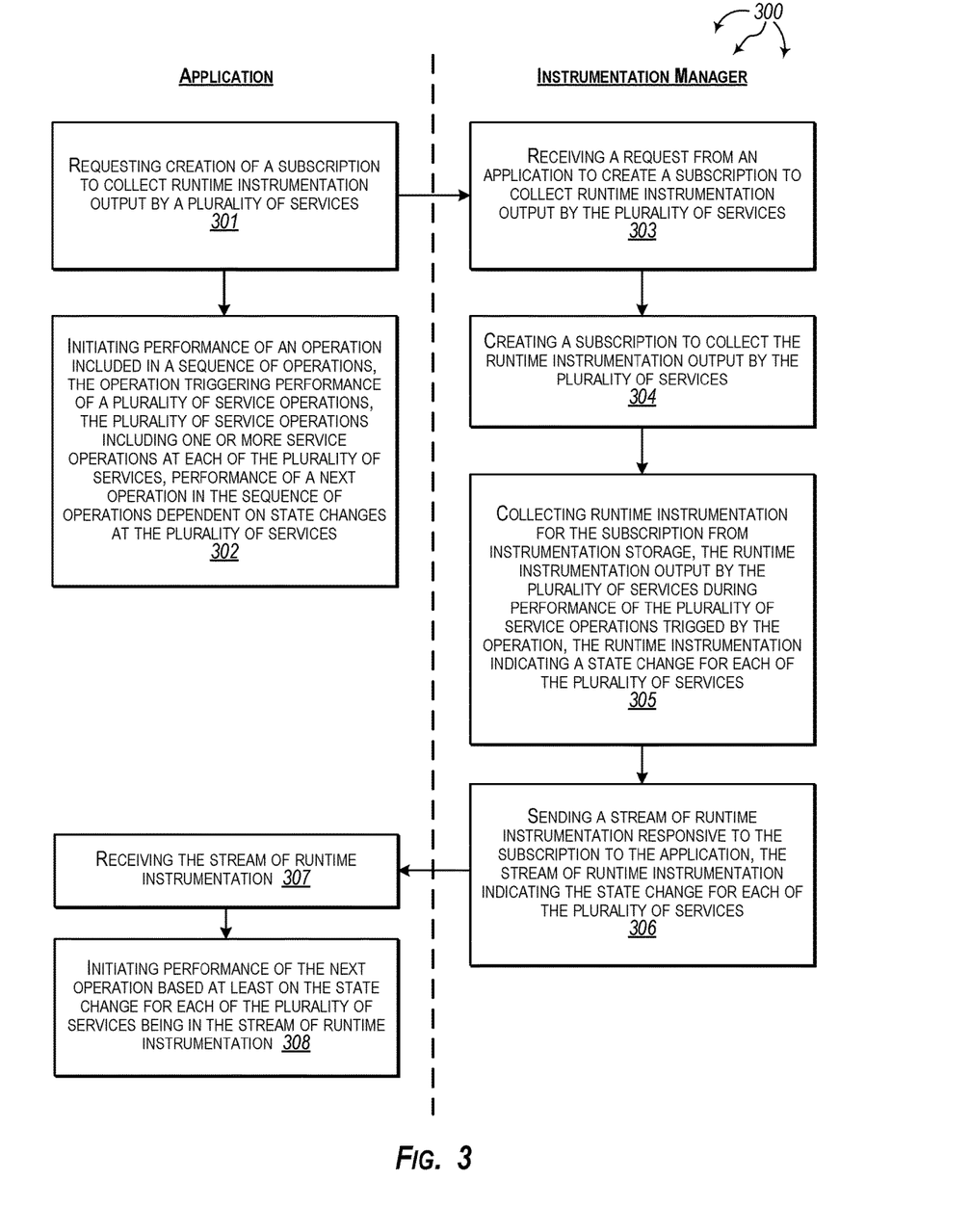
FIG. 3 illustrates a flow chart of an example method for orchestrating operations at an application.

FIG. 3 illustrates a flow chart of an example method 300 for orchestrating operations at client applications. Method 300 will be described with respect to the components and data of computer architecture 200.

Method 300 includes requesting creation of a subscription to collect runtime instrumentation output by the plurality of services (301). For example, subscription module 202 can send subscription request 241 to instrumentation manager 221.

Method 300 includes initiating performance of an operation included in the sequence of operations, the operation triggering performance of a plurality of service operations, the plurality of service operations including one or more service operations at each of the plurality of services, performance of a next operation in the sequence of operations dependent state changes at the plurality of services (302). For example, application 201 can initiate performance of operation 207 in operation sequence 206. Operation 207 can use interfaces/protocols 247 to trigger performance of a plurality of service operations at services 211. The plurality of service operations can include one or more service operations at each of services 211A, 211B, and 211C. Performance of the one or more service operations at each of services 211A, 211B, and 211C can generate instrumentation 212A, 212B, and 212C respectively. Instrumentation 212A, 212B, and 212C can include state changes for each of services 211A, 211B, and 211C and can be stored at instrumentation storage 231.

Operation 209 in operation sequence 206 can depend on state changes at each of services 211A, 211B, and 211C resulting from the plurality of performed service operations. Examples of service operations include: a file close event, a registry change notification, etc.

Method 300 includes receiving a request from an application to create a subscription to collect runtime instrumentation output by the plurality of services (303). For example, subscription manager 222 can receive subscription request 241 from application 201. Subscription request 241 can be a request to create a subscription to collect runtime instrumentation (including state changes) output by services 211.

Method 300 includes creating a subscription to collect the runtime instrumentation output by the plurality of services (304). For example, subscription manager 222 can create subscription 251 to collect runtime instrumentation (including state changes) output by services 211.

Subscription manager 222 can send subscription 251 to collectors 223. Collectors 223 can receive subscription 251 from subscription manager 222. Based on subscription 251, various collectors 223 can be selected to collect runtime instrumentation output by services 211.

Method 300 includes collecting runtime instrumentation for the subscription from instrumentation storage, the runtime instrumentation output by the plurality of services during performance of the plurality of service operations trigged by the client operation, the runtime instrumentation indicating a state change for each of the plurality of services (305). For example, selected collectors 223 can collect instrumentation 242 for subscription 251 from instrumentation storage 231. Instrumentation 242 can include at least relevant portions of instrumentation 212A, 212B, and 212C. The relevant portions can indicate a state change for each of services 211A, 211B, and 211C resulting from service operations performed at services 211A, 211B, and 211C.

State changes for each of services 211A, 211B, and 211C can include changes to one or more of: a completion state, such as, for example, success or failure, a ready state, a warning/error state, a resource availability state, etc. In one aspect, orchestration may pause until one or more services 211A, 211B, and 211C has started. Orchestration may start up services 211A, 211B, and 211C to parallelize a request but may wait for a ready state to indicate that services 211A, 211B, and 211C are ready. A warning/error state can alter the path of orchestration. For example, if one or services 211A, 211B, and 211C exhibits an error state, another different service may be used to perform an operation or other operations can be performed. Orchestration may pause until sufficient resources (e.g., CPU, memory, storage, etc.) are available to perform the next operation. Resource availability events at services 211A, 211B, and 211C can be monitored. In some aspects, resource availability is monitored for virtualized environments, such as, Virtual Machines ("VMs") or emulated environments, such as, phone and embedded chip emulators.

Collectors 223 can send instrumentation 242 to normalizer 224. Normalizer 224 can convert instrumentation 242 to normalized instrumentation 252. Instrumentation 242 can include various native instrumentation formats. Normalizer 224 can convert the various native instrumentation formats into a format consumable at application 201. Normalizer 224 can send normalized instrumentation 252 to publisher 226.

Method 300 includes sending a stream of runtime instrumentation responsive to the subscription to the application, the stream of runtime instrumentation indicating the state change for each of the plurality of services (306). For example, publisher 226 can publish instrumentation stream 243 from normalized instrumentation 252. Publisher 226 can send instrumentation stream 243 to client application. Instrumentation stream 243 is responsive to subscription 251 and can indicate the state change for each of services 211A, 211B, and 211 resulting from performed service operations. In one aspect, instrumentation stream 243 includes a set of properties, structures, lists, and metadata.

Method 300 includes receiving the stream of runtime instrumentation (307). For example, listener module 203 can receive instrumentation stream 243 from instrumentation manager 221. Method 300 includes initiating performance of the next operation based at least on the state change for each of the plurality of services being in the stream of runtime instrumentation (308). For example, based on the state change for each of services 211A, 211B, and 211C being included instrumentation stream 243, listener module 203 can create notification 244. Notification 244 indicates the state change for services 211A, 211B, and 211C resulting from performance of the one or more service operations triggered by operation 207. That is, notification 244 indicates state changes at services on which operation 209 depends.

Listener module 203 sends notification 244 to handler 208. In response to receiving notification 244, handler 208 initiates performance of operation 209.

In one aspect, a (e.g., client) operation triggers service operations at multiple other computer systems. A next operation can be dependent on state changes at one or more services at each of the multiple other computer systems. An application can subscribe for an instrumentation stream (including state changes) from each of the multiple other computer systems. When a listener determines from instrumentation streams that relevant state changes at one or more services have occurred, the listener can notify a handler to initiate the dependent operation.

Figure 4:
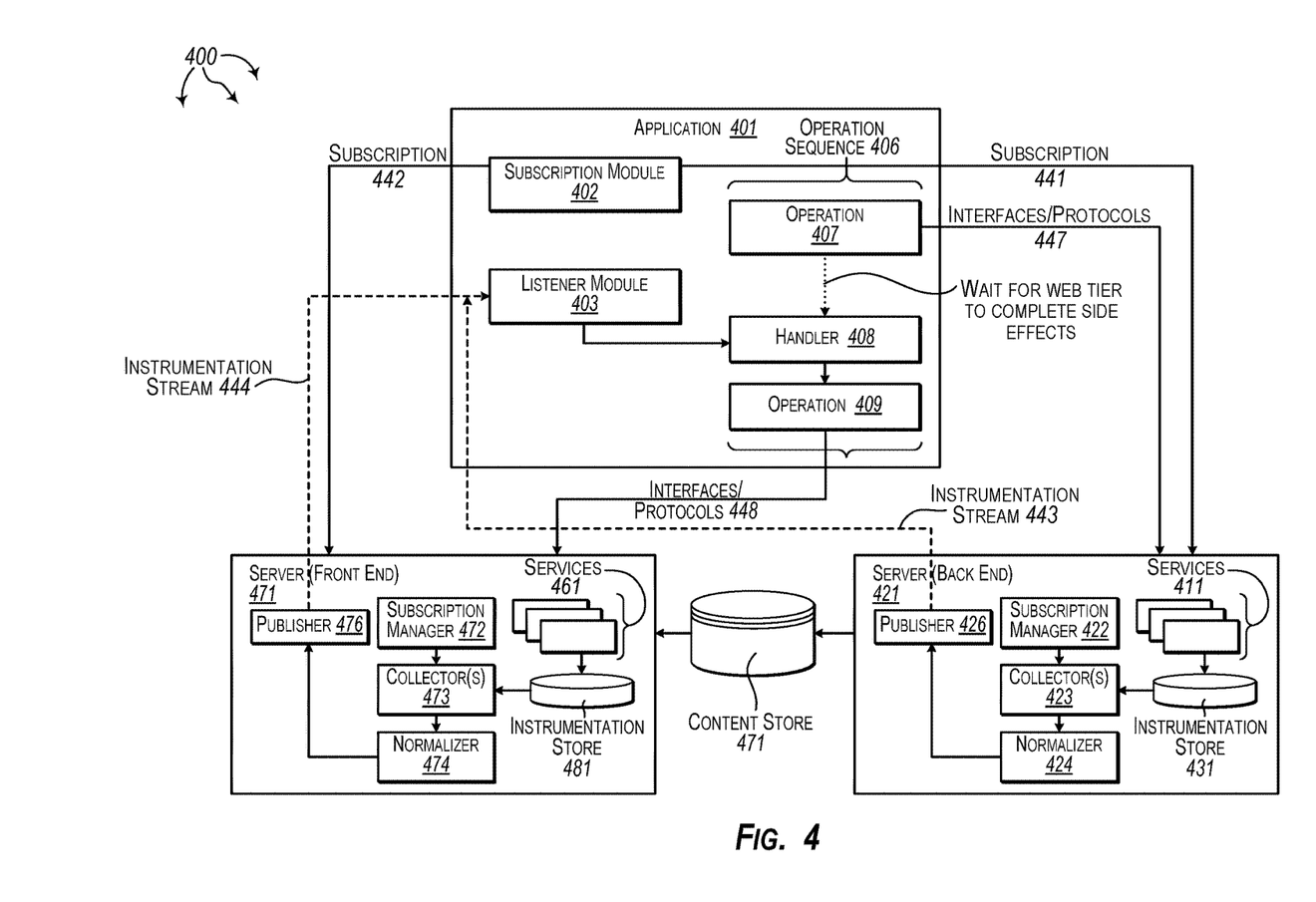
FIG. 4 illustrates an example computer architecture for orchestrating operations at an application through subscriptions with multiple instrumentation managers.

FIG. 4 illustrates an example computer architecture 400 that facilitates orchestrating operations at an application through subscriptions with multiple instrumentation managers. Referring to FIG. 4, computer architecture 400 includes application 401, server (backend) 421, and server (front end) 471. Application 401, server (backend) 421, and server (front end) 471 can be connected to (or be part of) a network, such as, for example, a Local Area Network ("LAN"), a Wide Area Network ("WAN"), and even the Internet. Accordingly, application 401, server (backend) 421, and server(front end) 471 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol ("SOAP"), etc. or using other non-datagram protocols) over the network.

Application 401 can be a client application, a non-client application, or another service. Application 401 can extend the functionality of services 411 and/or 461 by listening to events and adding operations automatically.

Application 401 can initiate operation 407 of operation sequence 406. Operation 407 can communicate with server (back end) 421 using interfaces/protocols 447 to trigger one or more service operations at services 411. Based on operation 407, application 401 can know that the one or more service operations performed by services 411 are to in turn trigger one or more service operations at services 461. Operation 409 can depend on the state of one or more of services 411 resulting from performance of one or more service operations at services 411. Operation 409 can also depend on the state of one or more of services 461 resulting from performance of one or more service operations at services 461. Accordingly, subscription module 402 can communicate with subscription manager 422 to create subscription 441 and can communicate with subscription manager 472 to create subscription 442.

The one or more service operations performed by services 411 can cause content to be stored at content store 471. During performance of the one or more service operations by services 411, instrumentation can be stored at instrumentation store 431. Collectors 423 can collect the stored instrumentation. Normalizer 424 can normalize the instrumentation. Publisher 426 can then publish the instrumentation (including state changes) in instrumentation stream 443 to listener module 403.

Storage of content at content store 471 can trigger one or more service operations at services 461 (e.g., to retrieve the stored content). During performance of the one or more service operations by services 461, instrumentation can be stored at instrumentation store 481. Collectors 473 can collect the instrumentation. Normalizer 474 can normalize the instrumentation. Publisher 476 can then publish the instrumentation (including state changes) in instrumentation stream 444 to listener module 403.

When instrumentation streams 443 and 444 indicate that services on which operation 409 depends have relevant state changes, listener module 403 can instruct handler 408 to initiate operation 409. Operation 409 can communicate with server (front end) 471 using interfaces/protocols 448 to trigger additional service operations at services 461.

Thus, an application can update a backend server, wait for side-effects to complete on a front end server, and then perform an operation on the front-end server. For example, the front end server can present data that is created by the back end server through a shared storage, such as, for example, a SQL server or simple file share. The front end server detects updates to the storage and alters the views and operations based on the data. In this configuration, the two systems are essentially decoupled and no express communication is needed. The application can provide a user interface for submitting content and performing additional operations on the front end when it is available.

The back end server can reliably report state changes at the back end server but may be unable to report when state changes have been incorporated by the front end server. The front-end server also has a set of instrumentation, including when new content is available. In either case, the instrumentation is designed for post-mortem debugging and contains sufficient information to identify the content associated with a given operation.

The instrumentation is leveraged at the application to make decisions related to initiating dependent operations. For example, the application is able to use this same instrumentation from the front end and use the state changes to identify the content change it is expecting. Additionally, the application is able to use the same instrumentation, from both the back end server and the front end server to provide a progress indicator to the user as the content moves through the system.

Figure 5:
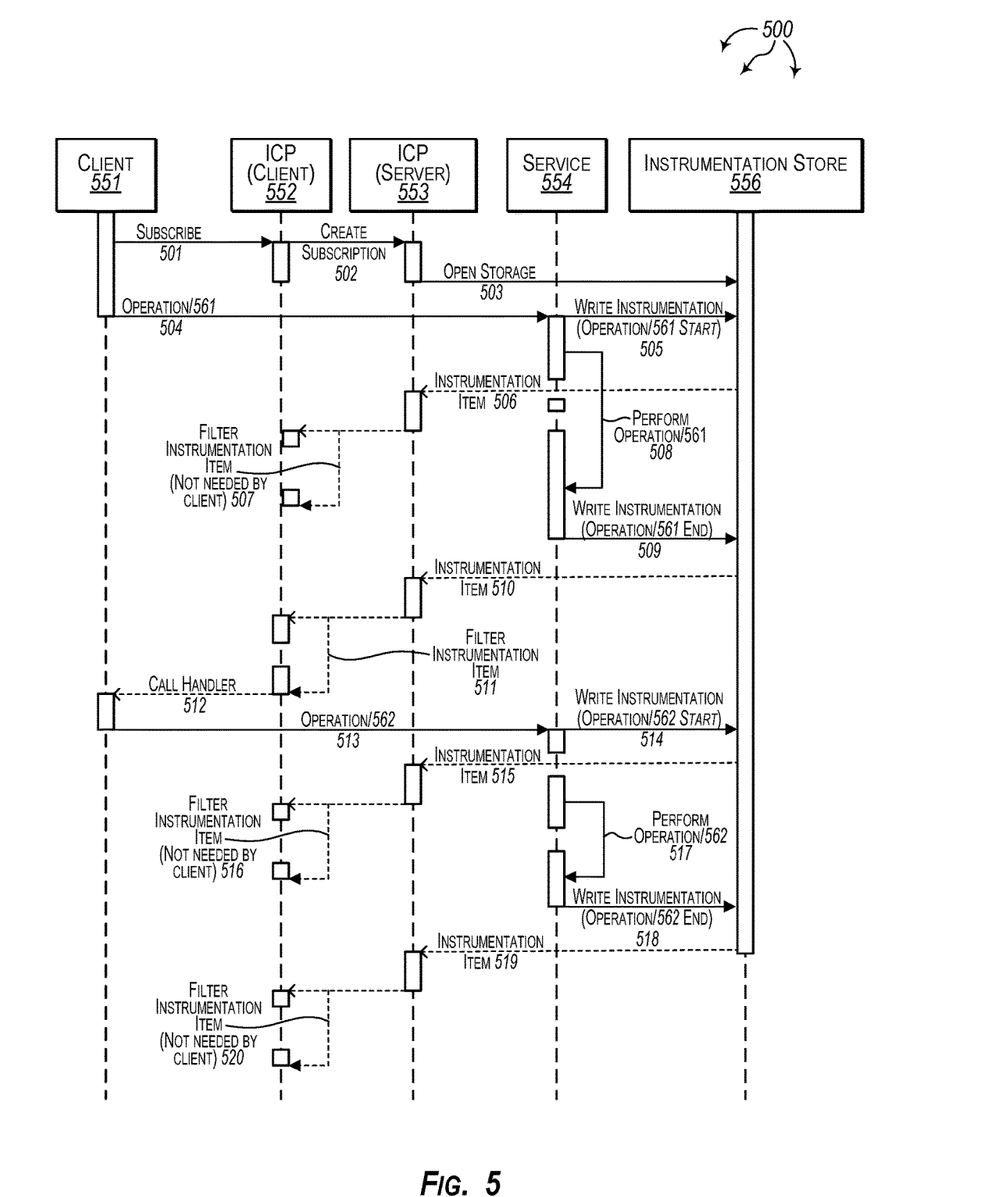
FIG. 5 illustrates an example data flow between a client, an instrumentation collector and publisher, and services.

FIG. 5 illustrates an example data flow 500 between a client, an instrumentation collector and publisher, and services.

Client application 551 invokes an API call to instrumentation collector and publisher ("ICP") client 552 to create rule-based subscription (501). The ICP client 552 passes along the subscription information to the ICP server 553 (502). The ICP server 553 sends the supplied information to the instrumentation store 556 to register the subscription (503).

The client application 551 invokes operation 561 on the involved service 554 (504). The service 554 triggers the operation 561 as per request and writes instrumentation to instrumentation store 556 (505). The instrumentation stream is sent back to ICP server 553 and is normalized by ICP server 553 (506). ICP server 553 sends back normalized stream to ICP client 552 and ICP client 552 filters it out since it is not needed (507).

Meanwhile service 554 continues to perform operation 561 (508). The service 554 writes instrumentation stream to instrumentation store 556 upon completion of the operation 561 (509). The instrumentation stream is sent back to ICP server 553 and is normalized by ICP server 553 (510). ICP server 553 sends back normalized stream to ICP client 552 and the normalized stream pass through the filter at ICP client 552 (511). ICP client 552 invokes callback handler from client application 551 (512).

Client application 551 triggers operation 562 on involved service 554 (513). Service 554 triggers the operation 562 as per request and writes instrumentation to instrumentation store 556 (514). The instrumentation stream is sent back to ICP server 553 and is normalized by ICP server 553 (515). ICP server 553 sends back normalized stream to ICP client 552 and ICP client 552 filters it out since it is not needed (516).

Meanwhile service 554 continues to perform operation 562 (517). Service 554 writes instrumentation stream to instrumentation store 556 upon completion of the operation 562 (518). The instrumentation stream is sent back to ICP server 553 and is normalized by ICP server 553 (519). ICP server 552 sends back normalized stream to ICP client 552 and ICP client 552 filters it out since it is not needed (520).

Aspects of the invention provide a light-weight, efficient solution for synchronization between services and client. Since events can be collected in essentially real time, a client application can be simultaneously notified upon an operation completion or a behavior change by a local or remote service. The client application can then generate user action corresponding to the completed operation. As such, the need for more complex synchronization or expensive polling actions is essentially eliminated.

In some aspects, a computer system comprises one or more hardware processors and system memory. The one or more hardware processors are configured to execute the instructions stored in the system memory to orchestrate a sequence of operations at an application.

The one or more hardware processors execute instructions stored in the system memory to request creation of a subscription to collect runtime instrumentation output by the plurality of services. The one or more hardware processors execute instructions stored in the system memory to initiate performance of an operation included in the sequence of operations. The operation triggers a plurality of service operations. The plurality of service operations include one or more service operations at each of a plurality of services. Performance of a next operation in the sequence of client operations is dependent on state changes at the plurality of services.

The runtime instrumentation indicates a state change for each of the plurality of services. The one or more hardware processors execute instructions stored in the system memory to receive a stream of runtime instrumentation responsive to the subscription. The stream of runtime instrumentation indicates a state change for each of the plurality of services. The one or more hardware processors execute instructions stored in the system memory to initiate performance of the next operation based at least on the state change for each of the plurality of services being in the stream of runtime instrumentation.

Computer implemented methods for performing the executed instructions to orchestrate a sequence of operations at an application are also contemplated. Computer program products for storing the instructions, that when executed by a processor, cause a computer system to gather state changes for orchestrating a sequence of operations at an application are also contemplated.

In other aspects, a computer system comprises one or more hardware processors and system memory. The one or more hardware processors are configured to execute the instructions stored in the system memory to gather state changes for orchestrating a sequence of operations at an application.

The one or more hardware processors execute instructions stored in the system memory to receive a request from an application to create a subscription for runtime instrumentation output by a plurality of services. The one or more hardware processors execute instructions stored in the system memory to create a subscription to collect the runtime instrumentation output by the plurality of services.

The one or more hardware processors execute instructions stored in the system memory to collect runtime instrumentation for the subscription from instrumentation storage. The runtime instrumentation output by the plurality of services during the performance of service operations at the plurality of services. The runtime instrumentation indicates a state change for each of the plurality of services. The one or more hardware processors execute instructions stored in the system memory to send a stream of runtime instrumentation responsive to the subscription to the application. The stream of runtime instrumentation indicates the state change for each of the plurality of services.

Computer implemented methods for performing the executed instructions to gather state changes for orchestrating a sequence of operations at an application are also contemplated. Computer program products for storing the instructions, that when executed by a processor, cause a computer system to gather state changes for orchestrating a sequence of operations at an application are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system, comprising:
   one or more hardware processors; and
   memory coupled to the one or more hardware processors, the memory storing instructions that are executable by the one or more hardware processors;
   wherein the one or more hardware processors are configured to execute the instructions stored in the memory to orchestrate a sequence of operations at an application, including the following:
   request creation of at least one subscription to collect information corresponding to instrumentation output by a plurality of services;
   initiate performance of a first operation included in the sequence of operations, wherein the first operation triggers one or more service operations at the plurality of services, wherein the instrumentation output by the plurality of services includes a specified instrumentation that results from the one or more service operations triggered by the first operation, wherein the specified instrumentation is in a format not consumable at the application, wherein the specified instrumentation indicates one or more state changes corresponding to the plurality of services, and wherein performance of a second operation included in the sequence of operations is dependent on at least one state change at the plurality of services;
   receive at least one instrumentation stream comprising normalized instrumentation responsive to the at least one subscription, wherein the normalized instrumentation comprises state change information corresponding to the plurality of services, and wherein the normalized instrumentation is in a different format than the specified instrumentation output by the plurality of services and is in a format consumable at the application; and
   initiate performance of the second operation based at least on the state change information in the normalized instrumentation.

2. The computer system of claim 1, wherein the performance of the second operation is dependent on completion of one or more service operations at a first server and one more service operations at a second server.

3. The computer system of claim 2, wherein:
   the at least one subscription comprises a first subscription to collect the information corresponding to the instrumentation output by the one or more service operations at the first server; and
   the at least one instrumentation stream comprises a first instrumentation stream comprising the normalized instrumentation corresponding to the first subscription.

4. The computer system of claim 3, wherein:
   the at least one subscription comprises a second subscription to collect the information corresponding to the instrumentation output by the one or more service operations at the second server; and
   the at least one instrumentation stream comprises a second instrumentation stream comprising the normalized instrumentation corresponding to the second subscription.

5. The computer system of claim 4, wherein the performance of the second operation is initiated based at least on:
   the first instrumentation stream indicating that each of the one or more service operations performed at the first server has completed; and
   the second instrumentation stream indicating that each of the one or more service operations performed at the second server has completed.

6. The computer system of claim 1, wherein the one or more service operations that are triggered by the performance of the first operation comprise at least one service operation performed by a service that is located across a process boundary.

7. The computer system of claim 1, wherein the performance of the second operation is based at least on the at least one instrumentation stream indicating that each of the one or more service operations has successfully completed.

8. A method for orchestrating a sequence of operations at an application running on a computer system, the method comprising:
   requesting creation of at least one subscription to collect information corresponding to instrumentation output by a plurality of services;
   initiating performance of a first operation included in the sequence of operations, wherein the first operation triggers one or more service operations at the plurality of services, wherein the instrumentation output by the plurality of services includes a specified instrumentation that results from the one or more service operations triggered by the first operation, wherein the specified instrumentation is in a format not consumable at the application, wherein the specified instrumentation indicates one or more state changes corresponding to the plurality of services, and wherein performance of a second operation included in the sequence of operations is dependent on at least one state change at the plurality of services;
   receiving at least one instrumentation stream comprising normalized instrumentation responsive to the at least one subscription, wherein the normalized instrumentation comprises state change information corresponding to the plurality of services, and wherein the normalized instrumentation is in a different format than the specified instrumentation output by the plurality of services and is in a format consumable at the application; and
   initiating performance of the second operation based at least on the state change information in the normalized instrumentation.

9. The method of claim 8, wherein the performance of the second operation is dependent on a file close event associated with the first operation.

10. The method of claim 8, wherein the performance of the second operation is dependent on a registry change notification associated with the first operation.

11. The method of claim 8, wherein initiating the performance of the first operation included in the sequence of operations comprises initiating performance of a client operation included in a sequence of SQL operations.

12. The method of claim 8, wherein the information corresponding to the instrumentation is collected from one or more of an event log, a log file, or an event trace.

13. The method of claim 8, wherein receiving the at least one instrumentation stream comprises receiving a plurality of instrumentation streams from a plurality of different sources, wherein each of the plurality of instrumentation streams comprises the normalized instrumentation, and wherein the normalized instrumentation is in a format that is consumable by the application.

14. The method of claim 13, wherein the at least one instrumentation stream comprises a set of properties, structures, lists, and metadata.

15. The method of claim 13, wherein initiating performance of the second operation comprises notifying a call handler that any service operations on which the second operation depends have completed.

16. A computer system, comprising:
   one or more hardware processors; and
   memory coupled to the one or more hardware processors, the memory storing instructions that are executable by the one or more hardware processors;
   wherein the one or more hardware processors are configured to execute the instructions stored in the memory to gather state changes for orchestrating a sequence of operations at an application, including the following:
      receive a request from the application to create at least one subscription for information corresponding to instrumentation output by a plurality of services;
      create the at least one subscription to collect the instrumentation output by the plurality of services;
      collect the instrumentation for the at least one subscription from instrumentation storage, wherein the instrumentation is output by the plurality of services during performance of service operations at the plurality of services, wherein the instrumentation comprises state change information corresponding to the plurality of services, wherein the instrumentation output by the plurality of services includes a specified instrumentation, wherein the specified instrumentation is in a native instrumentation format, and wherein the native instrumentation format is a format not consumable at the application;
      convert the specified instrumentation into normalized instrumentation, wherein the normalized instrumentation is in a format that is different from the native instrumentation format; and
      send at least one instrumentation stream comprising the normalized instrumentation to the application responsive to the at least one subscription, wherein the normalized instrumentation comprises the state change information.

17. The computer system of claim 16, wherein the instrumentation is collected from one or more of a disk file, an operating system event, or a kernel event.

18. The computer system of claim 16, wherein sending the at least one instrumentation stream to the application comprises sending an instrumentation stream across a process boundary.

19. The computer system of claim 16, wherein the at least one instrumentation stream indicates that at least one of the service operations has successfully completed.

* * * * *